US010156032B2

(12) United States Patent
Schlemmer

(10) Patent No.: US 10,156,032 B2
(45) Date of Patent: Dec. 18, 2018

(54) COMPENSATION LAYER AND METHOD FOR PRODUCTION OF THE SAME

(71) Applicant: Lisa Draexlmaier GmbH, Vilsbiburg (DE)

(72) Inventor: Christian Schlemmer, Landshut (DE)

(73) Assignee: Lisa Draexlmaier GMBH, Vilsbiburg (DE)

( * ) Notice: Subject to any disclaimer, the term of this patent is extended or adjusted under 35 U.S.C. 154(b) by 867 days.

(21) Appl. No.: 14/560,125

(22) Filed: Dec. 4, 2014

(65) Prior Publication Data
US 2015/0152580 A1    Jun. 4, 2015

(30) Foreign Application Priority Data
Dec. 4, 2013  (DE) .................. 10 2013 018 151

(51) Int. Cl.
| | | |
|---|---|---|
| B29C 51/26 | (2006.01) | |
| B32B 5/12 | (2006.01) | |
| B32B 37/10 | (2006.01) | |
| D04H 11/00 | (2006.01) | |
| B29C 51/42 | (2006.01) | |

(Continued)

(52) U.S. Cl.
CPC .......... D04H 11/00 (2013.01); B29C 51/004 (2013.01); B29C 51/425 (2013.01); B32B 5/026 (2013.01);
(Continued)

(58) Field of Classification Search
CPC ... B29C 51/004; B29C 51/425; B29C 51/428; B32B 5/022; B32B 5/026; B32B 5/08; B32B 5/12; B32B 37/10; B32B 37/1054; B32B 2605/003; D04B 7/12; D04B 11/08; D04B 23/08; D04B 21/02; D04B 21/04;
(Continued)

(56) References Cited

U.S. PATENT DOCUMENTS 5,514,458 A * 5/1996 Schulze-Kadelbach .....................
B32B 27/12
442/56
5,589,245 A * 12/1996 Roell ..................... D03D 27/10
428/311.11

(Continued)

FOREIGN PATENT DOCUMENTS

| DE | 39819 | 5/1969 |
|---|---|---|
| DE | 4428622 A1 | 2/1996 |

(Continued)

*Primary Examiner* — Michael A Tolin
(74) *Attorney, Agent, or Firm* — Finnegan, Henderson, Farabow, Garrett & Dunner, LLP

(57) ABSTRACT

A method for processing a compensation layer, used in a vehicle interior, to increase a pressure resistance of the compensation layer. The method includes providing an unprocessed compensation layer. The compensation layer includes a first layer formed of fiber stitches, a second layer formed of fiber stitches, and a plurality of pile fiber bundles, each formed of pile fibers, connecting the first and second layers. The method further includes displacing the first and second layers substantially translatorily towards one another to thereby deform the pile fiber bundles into a deformed state, such that a distance between the first and second layers is reduced. The method also includes fixing the pile fiber bundles in the deformed state, such that the pressure resistance of the compensation layer in the deformed state is greater than the pressure resistance of the unprocessed compensation layer.

7 Claims, 2 Drawing Sheets

(51) Int. Cl.
  B29C 51/00 (2006.01)
  B32B 5/02 (2006.01)
(52) U.S. Cl.
  CPC ............... B32B 5/12 (2013.01); B32B 37/10 (2013.01); *B32B 2605/003* (2013.01); *D10B 2321/022* (2013.01); *D10B 2331/04* (2013.01); *D10B 2401/06* (2013.01); *D10B 2505/12* (2013.01); *Y10T 156/1002* (2015.01); *Y10T 428/23957* (2015.04)
(58) Field of Classification Search
  CPC ........ D04H 1/4382; D04H 1/54; D04H 1/541; D04H 1/558; D04H 1/60; D04H 11/00; D10B 2401/06; D10B 2401/061; D10B 2403/021; D10B 2403/0211; D10B 2505/12
  See application file for complete search history.

(56) References Cited

U.S. PATENT DOCUMENTS 5,951,798 A * 9/1999 Schmidt .................... B32B 5/02
  156/148
6,231,940 B1 * 5/2001 Aichner .................... B32B 9/00
  428/332

FOREIGN PATENT DOCUMENTS

| DE | 19534252 A1 | 3/1997 | |
| DE | 20102637 U1 | 5/2001 | |
| DE | 102004022464 A1 * | 12/2005 | ............... B32B 5/26 |
| DE | 102004022464 A1 | 12/2005 | |
| EP | 2796283 A1 * | 10/2014 | ............ B32B 5/026 |
| WO | WO-2014174131 A1 * | 10/2014 | ............ B32B 5/026 |

* cited by examiner

COMPENSATION LAYER AND METHOD FOR PRODUCTION OF THE SAME

CROSS-REFERENCE TO RELATED APPLICATION

This application is based upon and claims the benefit of prior German Application No. 10 2013 018 151.8, filed on Dec. 4, 2013, the entire contents of which are incorporated herein by reference.

TECHNICAL FIELD

In motor vehicles, especially upper middle class or executive level motor vehicles, and also, for example, in the field of aviation, special value is placed on optical and haptic properties of a surface being especially classy and therefore of high quality.

Therefore, in motor vehicles, compensation layers are used in the area of the instrument panel, the door panel, the passenger seat, or the roof liner. In connection with a decorative element, the compensation layers provide appealing optical effects and a pleasant haptic effect and therefore result in a clear upgrade of the interior area.

BACKGROUND

Compensation layers, such as non-woven knitted pile fiber fabrics and their production are known, for example, from DD 39819. Non-woven knitted pile fiber fabrics generally comprise a first and a second layer, with the two layers being connected by pile fiber bundles located between them. Such non-woven knitted pile fiber fabrics are also known as Multiknit or Kunit. A non-woven knitted pile fiber fabric is a voluminous non-woven fabric with a first and/or second side consisting of fiber stitches. The non-woven fabrics are usually produced in high-effort processes. With conventional production methods, the length of the pile fiber bundles, which in turn determine the distance between the two fiber stitch layers, can be influenced if the material is specified. Furthermore, the increasing length of the pile fiber bundles influences the compression resistance of the compensation layer. With increasing length of the pile fiber bundles, the compression resistance of the compensation layer is reduced because longer bundles collapse easier than shorter bundles. Non-woven knitted pile fiber fabrics with long pile fiber bundles therefore also have a lesser resistance to pressure marks than those with short pile fiber bundles.

SUMMARY

One objective of the present disclosure is to provide a method for the production of a compensation layer, which has an increased compression resistance, a greater strength, a greater resistance to pressure marks, a better return, an improved slinkiness behavior to elevations and indentations, as well as an increased sustained resilience. Furthermore, another object of the present disclosure is to provide an appropriate compensation layer that has the aforementioned properties.

These objects are achieved with a method and compensation layer consistent with embodiments of the disclosure.

According to the disclosure, there is provided a method for producing a compensation layer. The compensation layer includes a voluminous non-woven knitted pile fiber fabric, such as a multi-knit, with a first and/or a second fiber stitch layer. Pile fiber bundles consisting of pile fibers are positioned between the fiber stitch layers and connect the fiber stitch layers.

The method consistent with embodiments of the disclosure includes providing the compensation layer; causing an essentially translatory displacement of the fiber stitch layers relative to one another so that the pile fiber bundles are deformed and the distance between the first and the second fiber stitch layer is reduced with respect to one another; and fixing the pile fiber bundles in their deformed condition.

Therefore, according to the disclosure, the first and second fiber stitch layers of the compensation layer are moved relative to one another in a translatory fashion. In other words, the first and second fiber stitch layers are displaced from their original position. In some embodiments, a distance between the two fiber stitch layers is identical at each place of the layers. In this manner, the translatory movement of the fiber stitch layers effects a deformation of the pile fiber bundles, with the fiber stitch layers remaining essentially in parallel alignment to one another. The pile fiber bundles extend over the entire surface of the compensation layer and form pile fiber walls. The pile fiber bundles extend from the first fiber stitch layer to the second fiber stitch layer so that the displacement of the two fiber stitch layers relative to one another leads to a deformation of the pile fiber bundles. The pile fiber bundles or pile fiber walls include pile fibers so that a deformation of the pile fiber bundles also leads to a deformation of the pile fibers as such. The deformation of the pile fiber bundles and/or the individual pile fibers causes them to be bent out of their original shape. This bending exerts a permanent stress on the pile fiber bundles, which leads to a mechanical internal stress on the pile fiber bundles or pile fiber walls and/or the pile fibers. The subsequent deformation of the pile fiber bundles permanently maintains the internal stress and therefore leads to an improvement of the compression resistance, the resistance to pressure marks, and the sustained resilience. The displacement of the two fiber stitch layers relative to one another furthermore generates a compaction of the pile fiber bundles or pile fiber walls and/or the pile fibers. This causes a free space between the individual pile fiber bundles to be reduced, which also leads to an improvement of the aforementioned mechanical properties.

In some embodiments, the translatory displacement of the fiber stitch layers relative to one another is executed as a whole. For example, an entire fiber stitch layer is displaced and this deforms the pile fiber bundles and/or the pile fibers. However, the movement of a predefined area of the fiber stitch layers is also possible so that only the selected area is deformed. This causes a partial reduction of the thickness in a specific, predefined area of the compensation layer and/or the fiber stitch layer, and therefore the thicknesses and compression resistances of the compensation material may be different at different places. This may be advantageous, for example, when using the compensation layer according to the disclosure in an interior. In particular, it can be adapted to an uneven substrate to which the compensation layer according to the disclosure is to be applied or which is to be lined with it. This means that the outwardly visible surface is perceived as even and straight.

Consistent with embodiments of the disclosure, the displacement of the fiber stitch layers may include two components along two directions, one being essentially parallel to a direction of extension of the fiber stitch layers and the other one being essentially perpendicular to the direction of extension of the fiber stitch layers. In some embodiments, the displacement is only parallel to the direction of extension of the fiber stitch layers. In this scenario, the pile fiber bundles are extended, with the parallel displacement of the fiber stitch layers relative to one another leading to a stacking of the pile fiber bundles. In this disclosure, a stacking of the pile fiber bundles means that the pile fiber bundles are tilted from their original position, and one end of a first pile fiber bundle is arranged above another end of another pile fiber bundle. Depending on a size of the displacement of the fiber stitch layers, the other pile fiber bundle may be a pile fiber bundle directly adjacent to the first pile fiber bundle. With a greater displacement, the other pile fiber bundle may be a pile fiber bundle not immediately adjacent to the first pile fiber bundle. For example, a deformed pile fiber bundle may extend over a plurality of pile fiber bundles.

In the following, the term "tilt of the pile fiber bundles" is explained in greater detail.

As already explained above, the pile fiber bundles extend from the first fiber stitch layer to the second fiber stitch layer, and each pile fiber has a first and a second end. The first end runs into the first fiber stitch layer. The second end of the pile fiber bundles runs into the second fiber stitch layer. If the first end and the second end of the pile fiber bundles are then connected to each other by an imagined straight connection line, the straight connection line describes the original position and orientation of the pile fiber bundle. The displacement of the fiber stitch layers parallel to one another and/or parallel to the direction of extension of the fiber stitch layers then causes the pile fiber bundles to tilt from their original positions. This means that the straight connection line connecting the first and second ends of a pile fiber bundle is moved/tilted from its original position (a first position) into a second position that deviates from the first position. The displacement of the fiber stitch layers parallel to one another then leads to an overlapping of the straight connection lines, which leads to a stacking of the pile fiber bundles.

If the fiber stitch layers are displaced essentially perpendicular to the direction of extension of the fiber stitch layers, the pile fiber bundles are subject to a compression fixing and become thicker. In this disclosure, a thickness of a pile fiber bundle refers to a spatial expansion of the pile fiber bundle transverse to its direction of extension. This makes the pile fibers of the pile fiber bundles bulkier and they protrude farther into the free spaces between the individual pile fibers.

Furthermore, there can also be a parallel and perpendicular displacement. This means that a vector superimposition of the two directions of displacement is possible, which can occur simultaneously as well as staggered. The displacement is again translatory. In this manner, a compacting is generated, which combines the aforementioned advantages of the two individual displacement directions.

Consistent with embodiments of the disclosure, the pile fibers of the pile fiber bundles are bent and/or compressed by the displacement so that they are pre-tensioned. The subsequent fixing of the pile fiber bundles in their deformed condition further maintains the pre-tensioning. This increases the counter-force, which is shown in form of a compression resistance and/or greater strength. Furthermore, it further improves the resistance to pressure marks and the sustained resilience.

Consistent with embodiments of the disclosure, the distance between the pile fiber bundles relative to one another is reduced by the displacement. The distance between the pile fiber bundles is defined by the distance of two aforementioned straight connection lines relative to one another. The distance is formed by a straight line that is imagined perpendicular to at least one connection line and is about in the center between the two fiber stitch layers. The shorter the perpendicular is the smaller is also the distance of the pile fiber bundles relative to one another. A tilt of the pile fiber bundles will in particular reduce the distance between the straight connection lines relative to one another. The displacement of the fiber stitch layers relative to one another can therefore also be compared to a parallelogram where each of the parallel straight lines are shortened in distance by a displacement of the parallelogram. The displacement and the related reduction of the distance of the pile fiber bundles relative to one another leads to a decrease of the free spaces between the pile fiber bundles so that the overall density of the compensation layer is increased. The compaction of the compensation layer also entails an increase of the compression resistance, strength, resistance to pressure marks, and sustained resilience.

In some embodiments, the pile fibers of adjacent pile fiber bundles come at least partially into contact due to the displacement. In other words, the translatory displacement of the fiber stitch layers relative to one another is performed to an extent that at least the adjacent pile fiber bundles come into contact. The contact restricts the movement of the pile fiber bundles relative to one another. If an external stress is applied, the pile fiber bundles can then no longer expand into their free spaces. The restriction then increases the internal stress of the pile fiber bundles which, as explained above, has an advantageous effect.

Because of the greater displacement of the two fiber stitch layers relative to one another, the pile fiber bundles are deformed so severely that the center piece of one of the pile fibers in a pile fiber bundle can protrude into an adjacent pile fiber bundle and intersect and/or at least come into contact with the fibers of the adjacent pile fiber bundle. In doing so, the ends of the pile fibers in a pile fiber bundle attached to the fiber stitch layers are outside of the adjacent pile fiber bundle. However, the center piece, e.g., the area of the pile fibers that is between the first and the second end of the pile fiber, extends into the adjacent pile fiber bundle.

In some embodiments, pile fibers that come into contact are fixed with one another. Fixing the pile fibers that come into contact reduces an effective length of the pile fibers. In this context, effective length of the pile fibers refers to the fact that the length of the pile fibers that is relevant for the compression fixing and the resilient effect is shortened. The relevant length of the pile fibers is a length that is essential for the bending of the pile fibers. The bending and/or the arm that acts on the pile fiber due to the force, acts on the pile fiber with a shorter arm. Compared to that, at the same force, a relatively long pile fiber would be subject to a relatively high force exertion. In combination with the increased internal stress of the pile fibers, this then causes the pile fibers to generate an increased counter-force. The counter-force then results in the compression resistance and/or strength of the compensation layer. It is irrelevant whether the pile fibers are pile fibers of adjacent pile fiber bundles, or pile fibers of the same bundle. Here, the only issue is that pile fibers coming into contact and/or intersecting are fixed with one another so as to reduce the effective length. By reducing the effective length of the pile fiber bundles, the properties of the compensation layer are improved, as already described above.

In some embodiments, contacting pile fibers are fixed with one another by means of thermal melting and/or gluing. Glues such as hot melt glue, hot melt powder, adhesive films, dispersion glue, low-melting particles, powder and fibers or a combination thereof can be used. In some embodiments, the temperature range for gluing is approximately 130° C. to 200° C.

In some embodiments, the pile fibers are at least partially formed of thermoplastic synthetic material, such as a bi-component material. The thermoplastic synthetic material may include, for example, a low-melting synthetic material. The bi-component material may include a polyester or polyester/polypropylene bonding fiber with a melting temperature of approximately 160° C. The bi-component material may also include frizzle fiber. This additionally improves the resilient properties. This material is better suited for subsequent processes such as adhesive coatings, decorative coatings, decorative press lining, e.g., a visible collapse of decorative material due to instability of the lining material is avoided. Furthermore, non-homogeneity of decorative materials is better compensated.

According to the disclosure, there is also provided a method for the production of a compensation layer. The compensation layer includes a voluminous non-woven knitted pile fiber fabric, such as multi-knit, with a first and a second fiber stitch layers and pile fiber bundles of pile fibers between the first and second fiber stitch layers and connecting the fiber stitch layers.

The method consistent with embodiments of the disclosure includes inserting the compensation layer into a flattening machine with a first flattening element and a second flattening element; generating a frictional connection between the first and second flattening elements and the first and second fiber stitch layers; causing an essentially translatory displacement of the flattening elements relative to one another so that the fiber stitch layers, which are frictionally connected to the flattening elements, are displaced and the pile fiber bundles connected to the fiber stitch layers are deformed, and the distance between the first and second fiber stitch layers is reduced; and fixing the pile fiber bundles in their deformed state.

In other words, the displacement of the fiber stitch layers relative to one another is effected by a flattening machine. The first and second fiber stitch layers are inserted between the flattening elements of the flattening machine. The flattening elements of the flattening machine are joined and each is connected to the corresponding fiber stitch layers of the compensation layer. Because of the subsequent displacement of the flattening elements relative to one another, there is also a relative displacement of the two fiber stitch layers. This in turn affects the pile fiber bundles located between the fiber stitch layers, which are then deformed. The subsequent fixing of the pile fiber bundles in their deformed state gives the compensation layer its final form.

According to the disclosure, there is also provided a compensation layer, which improves on the aforementioned properties as compared to the conventional compensation layer. The compensation layer according to the disclosure includes a voluminous non-woven knitted pile fiber fabric, such as multi-knit, with a first fiber stitch layer and a second fiber stitch layer, and pile fiber bundles of pile fibers between the first and second fiber stitch layers and connecting the fiber stitch layers. The pile fiber bundles are arranged in a tilted fashion relative to the first and second fiber stitch layers. In other words, the pile fiber bundles are not arranged perpendicularly to the fiber stitch layers. Rather, the pile fiber bundles have an angle that is developed not equal to 90° relative to the two fiber stitch layers. With respect to the "angle of the pile fiber bundles," reference is made to the explanations in reference to the "tilt of the pile fiber bundles." The pile fiber bundles consistent with embodiments of the disclosure facilitate a stacking of the pile fiber bundles, pile fiber walls, as already explained earlier. The stacking of the pile fiber bundles in turn also results in an increased compactness of the compensation layer.

In some embodiments, the pile fibers of a pile fiber bundle extend into an adjacent pile fiber bundle. This further homogenizes the compensation layer because on the one hand, the free spaces between the pile fiber bundles are made accessible by the pile fibers and on the other hand, the pile fibers of the respective adjacent pile fiber bundles protrude into one another. This further increases the overall density of the compensation layer.

In some embodiments, pile fibers of a pile fiber bundle and pile fibers of an adjacent pile fiber bundle at least partially come into contact.

In some embodiments, pile fibers coming into contact are at least partially fixed with one another. Fixing the contacting pile fibers shortens the effective length of the pile fibers. An external force on the compensation layer therefore causes the force exertions created by the force being less than the force exertions at a greater effective length. Consequently, this increases the compression resistance and/or the strength of the compensation layer and improves the resistance to pressure marks and sustained resilience.

In some embodiments, the ends of the pile fibers extend perpendicularly into the first and second fiber stitch layers. In other words, the first and the second ends of a pile fiber are such arranged in the fiber stitch layers that they run perpendicular to the surface and/or the fiber stitch layers. Because the pile fiber bundles protrude perpendicularly into the fiber stitch layers, a high internal stress of the pile fiber bundles is generated. In some embodiments, the pile fiber bundles have an S-form. Because the pile fiber bundles extend perpendicularly into the fiber stitch layer, the fiber stitch layer itself is developed planar. This means that in unstressed condition, the fiber stitch layers are not influenced by the bent of the pile fiber bundles, such that they are not bruised. This facilitates an especially planar surface and/or haptic layer, especially on the viewing side.

In some embodiments, the pile fibers are formed at least partially of a thermoplastic synthetic material, such as a bi-component material. Because of the partial firmly bonded fiber connection, a homogeneous, pressure-resilient material is formed from a non-homogeneous material, which is delimited by at least one stitch layer.

DESCRIPTION OF THE EMBODIMENTS

Figure 1:
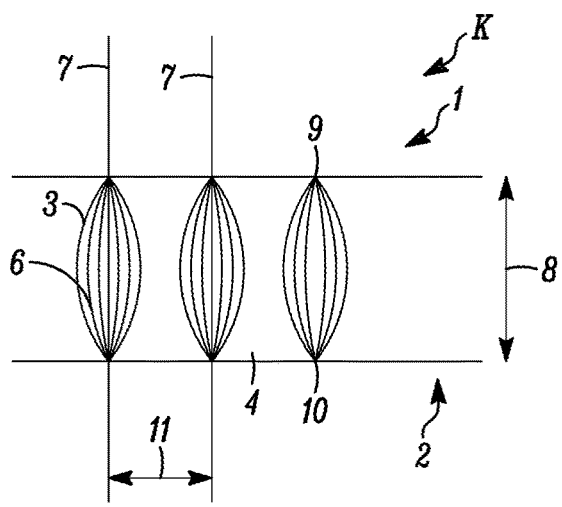
FIG. 1 shows a compensation layer, such as a non-woven knitted pile fiber fabric, according to the conventional technology.

FIG. 1 shows a conventional non-woven knitted pile fiber fabric as a compensation layer, including a first fiber stitch layer 1, a second fiber stitch layer 2, and pile fiber bundles 3 between the first and second fiber stitch layers 1, 2. The pile fiber bundles 3 include pile fibers 6. Between the pile fiber bundles 3 is a free space 4. The free space 4 is essentially determined by a distance 11 between the pile fiber bundles 3. The closer the pile fiber bundles 3 are together, e.g., the smaller the distance 11 between the pile fiber bundles 3, the smaller is the free space 4 between the pile fiber bundles 3. The distance 11 between the pile fiber bundles 3 and/or pile fiber walls is defined by straight connection lines 7. A straight connection line 7 runs through a first end 9 and a second end 10 of a pile fiber bundle 3. The ends 9, 10 of a pile fiber bundle 3 are at places of the pile fiber bundle 3 where it extends into the fiber stitch layers 1, 2.

Figure 2:
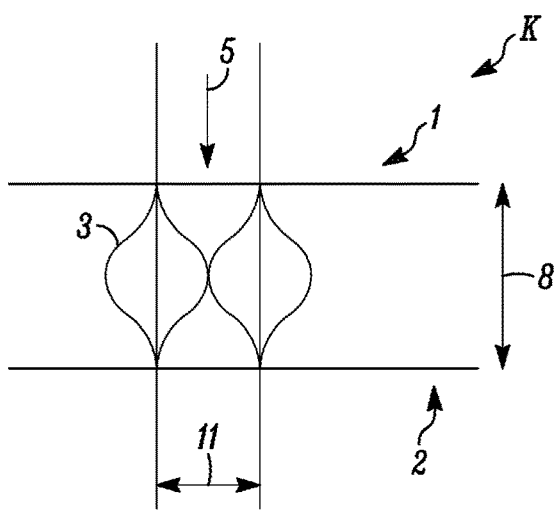
FIG. 2 shows the non-woven knitted pile fiber fabric after perpendicular displacement.

FIG. 2 shows a non-woven knitted pile fiber fabric where the first and the second fiber stitch layers 1, 2 are displaced relative to one another. The displacement is made in a direction of an arrow 5 so as to result in a compression of the non-woven fabric. A distance 8 between the first and second fiber stitch layers 1, 2 is reduced by the compression, i.e., by the displacement of the two fiber stitch layers 1, 2 relative to one another. Therefore, there is a compaction of the compensation layer as a result of the displacement of the two fiber stitch layers 1, 2. The force and/or the displacement direction 5 is perpendicular to the direction of extension of the fiber stitch layers 1, 2 in the example shown in FIG. 2. The distance 11 of the pile fiber bundles 3 relative to one another is not affected by the displacement. The distance 11 between the pile fiber bundles is therefore constant.

Figure 3:
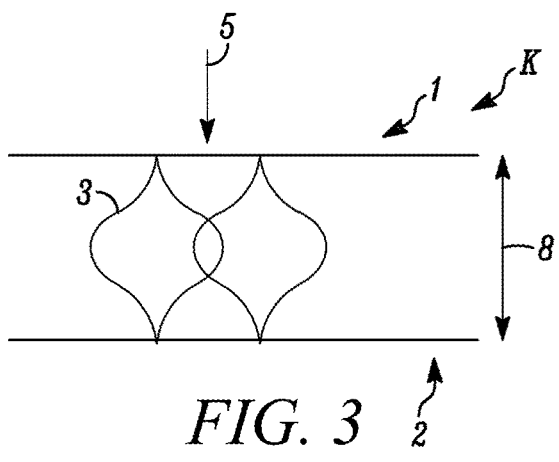
FIG. 3 shows a non-woven knitted pile fiber fabric according to the disclosure, with increased force compared to that shown in FIG. 2.

FIG. 3 shows a non-woven knitted pile fiber fabric where the first and second fiber stitch layers 1, 2 are displaced relative to one another, with the displacement 5 being perpendicular to the direction of extension of the fiber stitch layers 1, 2. In FIG. 3, the non-woven fabric is further compressed as compared to the scenatio shown in FIG. 2. This means that the distance 8 of the fiber stitch layers 1, 2 relative to one another in FIG. 3 is smaller than the distance 8 shown in FIG. 2. Because of the stronger displacement 5, the pile fiber bundles 3 are further compressed. This compression results in the pile fibers 6 being dented and bent more so that the pile fiber bundles 3 become thicker. The ends 9, 10 of the pile fiber bundles remain constant in their relative position to one another. They are different only in that the distance to one another was shortened. The strong bending of the pile fibers 6 causes the pile fiber bundles 3 to protrude farther into the free space 4. The perpendicular displacement 5 of the fiber stitch layers 1, 2 relative to one another can be controlled to the extent that the pile fiber bundles 3 extend into adjacent pile fiber bundles 3. In particular, the actual pile fibers 6 extend into the adjacent pile fiber bundles 3. This results in a homogenization of the compensation layer, causing the compensation layer to generate a constant haptic along its direction of extension.

Figure 4:
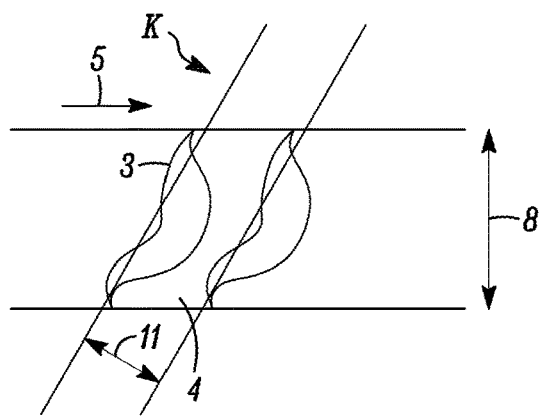
FIG. 4 shows a non-woven knitted pile fiber fabric according to the disclosure, after being applied a parallel force.

FIG. 4 shows a compensation layer, in particular non-woven knitted pile fiber fabric, where the first and second fiber stitch layers 1, 2 are displaced in parallel and relative to the direction of extension of the fiber stitch layers 1, 2. As shown in FIG. 4, the straight connection line 7 is tilted relative to the original position in FIG. 1. The straight connection line 7 therefore includes an angle relative to the first and second fiber stitch layers 1, 2, which is not equal to 90°. Because of the displacement 5 of the first and second fiber stitch layers 1, 2 relative to one another and in a direction 5 parallel to the direction of extension of the fiber stitch layers 1, 2, the distance 11 between the straight connection lines 7 is reduced. In other words, the distance 11 between the actual pile fiber bundles 3 is shortened.

Figure 5:
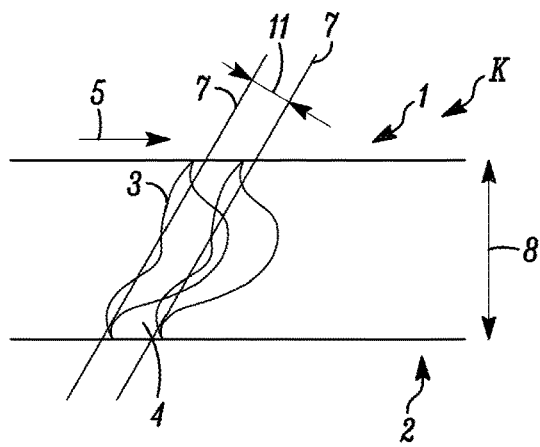
FIG. 5 shows a non-woven knitted pile fiber fabric according to the disclosure, after being applied a force acting in a direction parallel to a direction of extension of fiber stitch layers, with the force being larger than that shown in FIG. 4.

FIG. 5 shows an example where the fiber stitch layers 1, 2 are displaced farther relative to one another and parallel to the direction of extension of the fiber stitch layers 1, 2. Compared to the example shown in FIG. 4, the fiber stitch layers 1, 2 in FIG. 5 are displaced relative to one another far enough so that the pile fiber bundles 3 almost completely fill the free space 4 because of the displacement. They can be displaced far enough that the pile fibers 6 of individual pile fiber bundles 3 protrude into the adjacent pile fiber bundles 3.

Figure 6:
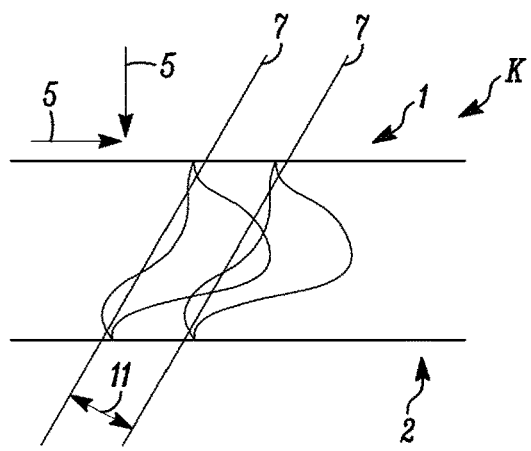
FIG. 6 shows a non-woven knitted pile fiber fabric according to the disclosure.

FIG. 6 shows another example of the compensation layer according to the disclosure, where the displacement 5 of the fiber stitch layers 1 and 2 occurs relative to one another as well as parallel to the direction of extension of the fiber stitch layers 1, 2, and also perpendicular to the direction of extension of the fiber stitch layers 1, 2. This displacement 5 causes a compaction of the compensation layer K. The distance of the pile fiber bundles 3 is reduced because of the parallel displacement of the fiber stitch layers 1, 2, with a simultaneous compressing, e.g., the displacement of the fiber stitch layers 1, 2 perpendicular to the extension of the fiber stitch layers, leading to a compression of the pile fiber bundles 3. The pile fibers 6 of an individual pile fiber bundle 3 extend into an adjacent pile fiber bundle 3 and therefore intersect it. In part, they only come into contact, with a subsequent fixing process, e.g., a thermal and/or plastic fixing of the pile fiber bundles 3, pile fiber walls, and connecting of the pile fibers 6 to one another, causing an effective length of the pile fibers 6 to be reduced. Subsequent force on the compensation layer causes the internal stress of the pile fibers 6 and in particular the pile fiber bundles 3 to lead to an increased counter-stress. Therefore, if the compensation layer is compressed by only a few millimeters, the compensation layer consistent with embodiments of the disclosure effects a higher counter-stress than the conventional non-woven knitted pile fiber fabrics known to date.

At a base weight of 300 to 450 g/dm$^3$, the thickness is reduced from about 8 mm to about 3.5 mm when using the method according to the disclosure, with a simultaneous improvement of the compression resistance and strength. The displacement 5 of the two fiber stitch layers 1 and 2 relative to one another can be improved further with a thermal compression process, a vibration, shaking process of a flattening table. In particular a shaking movement of the upper and lower fiber stitch layers 1, 2 leads to a clear homogenization of the non-woven knitted pile fiber fabric. Because of the shaking movement of the fiber stitch layers 1, 2 relative to one another, the pile fibers 6 of the individual pile fiber bundles 3 can protrude into the adjacent pile fiber bundles 3.

The non-woven knitted pile fiber fabrics illustrated in the FIGS. 1 to 6 show pile fiber bundles 3 with ends 9 and 10 that protrude perpendicular into the fiber stitch layers 1, 2. In some embodiments (not shown) of the present disclosure, pile fiber bundles that do not protrude perpendicular into the fiber stitch layer 1, 2 are provided. The pile fiber bundles can be arranged S-shaped, arc-shaped or oblique, e.g., diagonal.

LIST OF REFERENCE SYMBOLS

1 First fiber stitch layer
2 Second fiber stitch layer

3 Pile fiber bundle, pile fiber walls
4 Free space
5 Direction of displacement
6 Pile fibers
7 Straight connection line
8 Distance of the fiber stitch layers
9 First end of a pile fiber bundle
10 Second end of a pile fiber bundle
11 Distance between pile fiber bundles
K Compensation layer

What is claimed is:

1. A method for processing a compensation layer, used in a vehicle interior, to increase a pressure resistance of the compensation layer, the method comprising:
   providing an unprocessed compensation layer, wherein the compensation layer includes a first layer formed of fiber stitches, a second layer formed of fiber stitches, and a plurality of pile fiber bundles, each formed of pile fibers, connecting the first and second layers;
   displacing the first and second layers in a direction substantially perpendicular to a direction of extension of the first and second layers and in a direction substantially parallel to the direction of extension, wherein the first and second layers are moved substantially translatorily towards one another to thereby deform the pile fiber bundles into a deformed state, such that a distance between the first and second layers is reduced; and
   fixing the pile fiber bundles in the deformed state, such that the pressure resistance of the compensation layer in the deformed state is greater than the pressure resistance of the unprocessed compensation layer.

2. The method according to claim 1, wherein displacing the first and second layers includes displacing the first and second layers so that the pile fibers are bent or compressed.

3. The method according to claim 1, wherein displacing the first and second layers includes displacing the first and second layers so that a distance between the pile fiber bundles is reduced.

4. The method according to claim 1, wherein displacing the first and second layers includes displacing the first and second layers so that the pile fibers at least partially contact each other.

5. The method according to claim 4, wherein fixing the pile fiber bundles includes fixing the contacting pile fibers with one another.

6. The method according to claim 5, wherein fixing the contacting pile fibers includes fixing the contacting pile fibers by at least one of a partial thermal melting or a gluing.

7. A method for processing a compensation layer, used in a vehicle interior, to increase a pressure resistance of the compensation layer, the method comprising:
   inserting an unprocessed compensation layer in a flattening machine having a first flattening element and a second flattening element, wherein the compensation layer includes a first layer formed of fiber stitches, a second layer formed of fiber stitches, and a plurality of pile fiber bundles, each formed of pile fibers, connecting the first and second layers;
   generating a connection between the first flattening element and the first layer and a connection between the second flattening element and the second layer;
   displacing the first and second flattening elements in a direction substantially perpendicular to a direction of extension of the first and second layers and in a direction substantially parallel to the direction of extension, wherein the first and second flattening elements are moved substantially translatorily toward one another to thereby displace the first and second layers substantially translatorily toward one another, and thus deform the pile fiber bundles into a deformed state, such that a distance between the first and second layers is reduced; and
   fixing the pile fiber bundles in the deformed state, such that the pressure resistance of the compensation layer in the deformed state is greater than the pressure resistance of the unprocessed compensation layer.

* * * * *

UNITED STATES PATENT AND TRADEMARK OFFICE
CERTIFICATE OF CORRECTION

PATENT NO. : 10,156,032 B2
APPLICATION NO. : 14/560125
DATED : December 18, 2018
INVENTOR(S) : Christian Schlemmer It is certified that error appears in the above-identified patent and that said Letters Patent is hereby corrected as shown below:

On the Title Page

Item (30), under "Foreign Application Priority Data,":
"Dec. 4, 2013 (DE ....... 10 2013 018 151"
Should read:
-- Dec. 4, 2013 (DE) ....... 10 2013 018 151.8 --.

Signed and Sealed this
Seventh Day of May, 2019

Andrei Iancu
*Director of the United States Patent and Trademark Office*